United States Patent [19]

Egleme

[11] 3,760,789
[45] Sept. 25, 1973

[54] SAW BLADE
[75] Inventor: Paul E. Egleme, Rixensart, Belgium
[73] Assignee: Norton Company, Worcester, Mass.
[22] Filed: Dec. 3, 1971
[21] Appl. No.: 204,631

Related U.S. Application Data
[63] Continuation-in-part of Ser. No. 868,694, Oct. 23, 1969, abandoned.

[52] U.S. Cl. ................ 125/17, 125/18, 83/835, 145/33
[51] Int. Cl. .............................................. B28d 1/06
[58] Field of Search ............................. 125/16–19; 143/133; 145/32, 33, 35 E; 83/853, 662, 835

[56] References Cited
UNITED STATES PATENTS
2,330,854   10/1943   Wolfard ............................. 145/32
1,882,328   10/1932   Kinkel ............................... 145/33 R
2,214,827    9/1940   Boe ................................... 143/133

FOREIGN PATENTS OR APPLICATIONS
116,008    5/1918   Great Britain ..................... 143/133
165,696   12/1958   Sweden ............................. 125/19
  4,516   11/1879   Great Britain ..................... 125/16
 99,498    7/1940   Sweden ............................. 143/133
467,832   12/1951   Italy ................................. 125/17

Primary Examiner—Harold D. Whitehead
Attorney—Allan R. Redrow et al.

[57] ABSTRACT

An improved saw structure includes a novel saw blade which can be mounted in a mounting frame to produce tensile stresses directed towards both edges of the elongate blade and generally perpendicular to a cutting edge of the blade. Further tensile stresses are directed lengthwise along the imaginary median line. The blade is provided with cutting elements along one of its edges, and its backing edge is arcuate in form.

9 Claims, 10 Drawing Figures

INVENTOR
PAUL E. EGLEME

BY
ATTORNEY

SAW BLADE

RELATED APPLICATIONS

This application is a continuation-in-part of my co-pending U.S. Pat. application Ser. No. 868,694, filed Oct. 23, 1969, now abandoned.

BACKGROUND AND BRIEF DESCRIPTION OF INVENTION

This invention relates to improved saw structures and saw blades for use therewith. The invention is especially concerned with saw structures which can be utilized for sawing stone, timber, metals, and other materials.

It is well known in this art that one great drawback of saw blades lies in the fact that they are subject to deflections during a cutting operation, with the result that pieces sawed off have incurved faces and do not have the same thickness throughout. The unwanted deflections are due to pressures which must be applied to the blades in order to saw through materials, especially very hard materials.

This drawback is particularly noticeable in the art of sawing stone with the aid of saw blades having segments fitted with diamonds to form cutting surfaces. Very great pressures are exerted on such saw blades in order to perform a sawing operation, especially in the case of hard stones, and the pressures may be so strong that they actually exceed the strength of the blades. Thus, there may be occasions where it is impossible to saw very hard stones, such as certain granites with a high quartz content, with the aid of blades having segments fitted with diamonds.

It has been proposed in the past to stretch a saw blade in directions which are oblique to the median line of the saw blade in order to create a tensile component perpendicular to the edge of the blade. The intention of such stretching is to eliminate or greatly reduce the deflection tendency of the saw blade. For example, blades have been equipped at each end with two holes intended to receive pins which engage in V-slots formed in lugs used for connecting the blades to sawing frames. If the V-slots of the two lugs are opened towards one another, the blade is tensioned in oblique directions when the lugs are forced to move away from each other. However, the effect obtained by this arrangement is not very marked when a saw blade with conventional parallel edges is used, even if this procedure is combined with a previously known technique of weakening the middle part of a blade by use of cut-outs or by reducing its thickness.

In accordance with the present invention, a saw blade, and the manner in which it is mounted, remedies the drawback of deflections occurring during a sawing operation by an application of tensile forces along oblique angle lines relative to a median line of a specially shaped blade. This is accomplished with an arrangement which includes an elongate blade means having a relatively wide body portion defining first and second edges along the length of the blade means. The first edge is provided with cutting means, such as diamond elements secured to a face of the edge, and the second edge is the back of the blade. The back edge is arcuate in form, and the first and second edges are related to each other to provide a blade body having relatively wide end portions and a relatively narrower center portion. The blade means includes securing means carried at each of the relatively wide end portions thereof for mounting the blade means within a mounting frame means. The securing means may comprise apertures formed at opposite ends of the blade means for receiving tensioning devices carried by the mounting frame. The securing means are positioned so that the tensioning devices, when operatively secured to the securing means at each end of the blade means, will produce (a) tensile stresses which are directed towards both the first and second edges of the blade means along lines generally oblique to an imaginary median line passing substantially centrally through the length of the blade means and (b) tensile stresses directed lengthwise along the median line. Thus, with the arrangement of the present invention, there is no tendency to produce a convex curve in the cutting edge of the blade, and there is no warping or displacement of the backing edge thereof. Preferably, the cutting edge of the blade is arcuate and is defined by an arc segment of a circle.

In one embodiment of the invention, the cutting edge of the blade has a shape which substantially corresponds to the arc of a circle so that the width of the blade is greater at the ends than at its center. The blade means is mounted in a triangular frame of a type in which the apex opposite the blade means constitutes the center of the curved cutting edge. The frame is arranged to be driven in a rocking motion back and forth about a pivot axis defined at the same apex. A plurality of such blades may be carried by a single mounting frame for cutting blocks of stone or other material.

In a second form of the invention, the cutting edge of the relaxed blade is slightly arched outwardly in such a way that the cutting edge becomes substantially rectilinear when oblique tensions are applied to the blade. This form of blade means is mounted in a frame which is adapted to perform a rectilinear reciprocating movement.

Any conventional means, such as hydraulic, screw type or wedge type means, may be used to stretch the saw blade of this invention in oblique directions for the purpose of producing the above tensile stresses. The tensioning of the saw blades in oblique directions is advantageously facilitated by weakening the middle part of the blade in a manner known per se, such as by means of cut-outs or reductions in thickness.

These and other features and advantages of the present invention will become apparent in the more detailed discussion which follows. In that discussion reference will be made to the accompanying drawings as briefly described below.

DETAILED DESCRIPTION OF INVENTION

Figure 1:
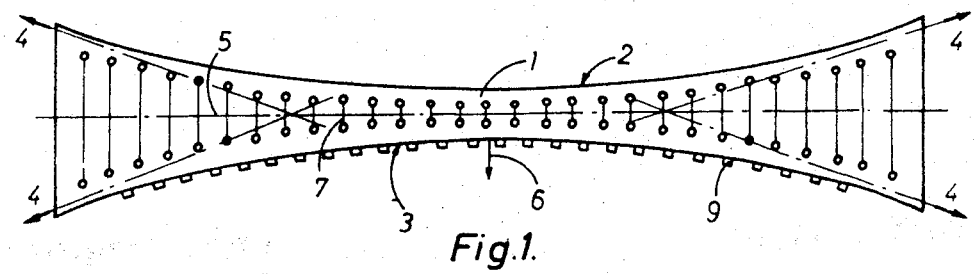
FIG. 1 is a side elevation of a saw blade showing a preferred form of saw blade in accordance with this invention.
Figure 2:
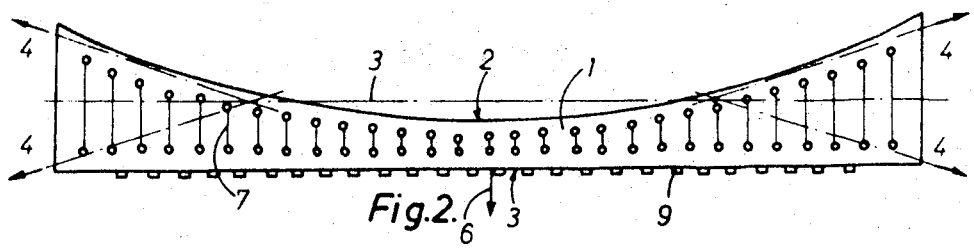
FIG. 2 is a side elevation showing a modified form of saw blade in accordance with the invention.
Figure 3:
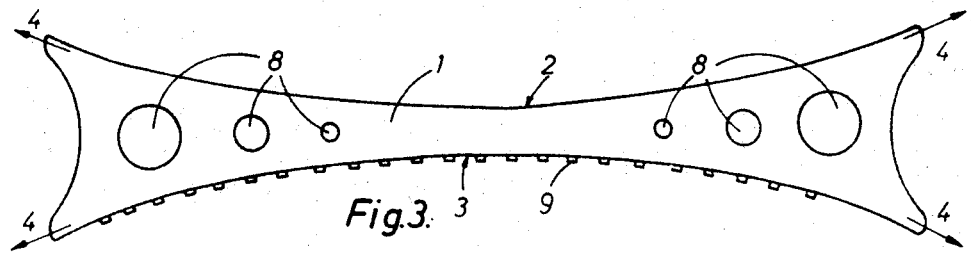
FIG. 3 shows a side elevation of a modification of the structure of FIG. 1.
Figure 4:
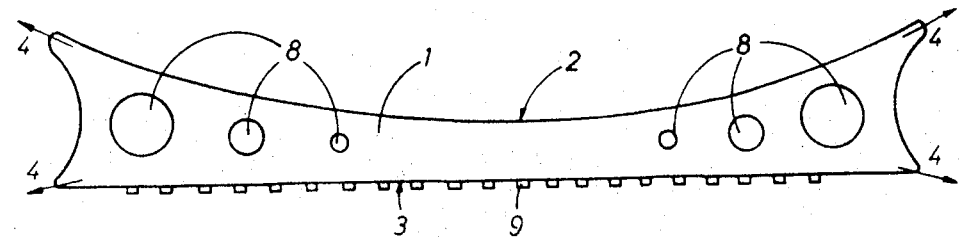
FIG. 4 shows a side elevation of a modification of the structure of FIG. 2.

In all of the drawings, the blade means 1 comprises an elongate structure having a relatively wide body portion which includes a concave back edge 2 incurved towards a cutting edge 3 of the blade means. The cutting edge 3 will be referred to in the claims herein as a first edge, and the back edge 2 will be referred to as a second edge of the blade means 1. In one embodiment of blade means (FIGS. 1, 3 and 5 – 10), the cutting edge 3 has substantially the shape of an arc of a circle so that the blade 1 is wider at its end portions than in its middle. Another embodiment of blade means (as shown in FIGS. 2 and 4) provides for a cutting edge 3 which is very slightly outwardly arched in its relaxed condition so that the cutting edge becomes substantially a straight line after being tensioned in a mounting frame.

As will be discussed in greater detail below, tension may be applied by any conventional means carried by a mounting frame for the saw blade means of this invention. Tension is applied in the directions of the arrows 4 (FIGS. 1 and 2) which are oblique in relation to an imaginary straight median line 5. This results in a tensile component 6 which is essentially perpendicular to the cutting edge 3 and which prevents deflection of the blade 1 during the sawing operation. This tensile component 6 may be increased by weakening the middle of the blade means by slots 7 or cut-outs 8.

Bioconcave blades (FIGS. 1 and 3) are mounted on a triangular mounting frame in which one or more blades constitute one of the sides of the triangle and the opposite apex constitutes the center of the circular arc defined by the cutting edge 3. The opposite apex also defines a pivotal axis of reciprocating movement applied to the triangular mounting frame. In the case of the cutting edge 3 which is rectilinear (FIGS. 2 and 4) when the blade is under tension, one or more blades are stretched in a flat frame which is capable of executing a rectilinear reciprocating movement.

In FIGS. 1 – 4, the cutting edge 3 of each blade means includes segments 9 which are fitted with diamonds and are particularly suitable for sawing stone. For other materials, the cutting edge may be provided with other known types of cutting means on its face. Such other known types would include tooth profiles formed into the cutting edge 3 of the blade means.

Figure 5:
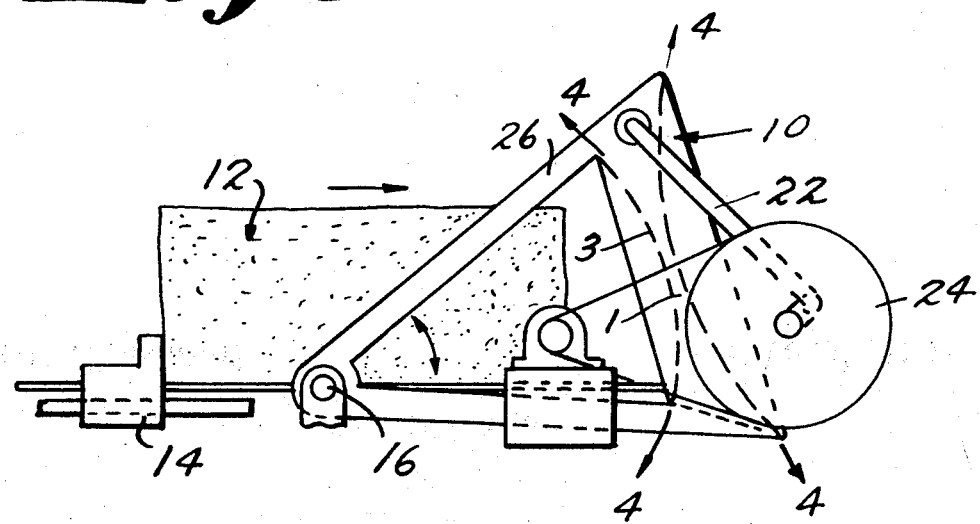
FIG. 5 is a side elevation of a typical installation utilizing a plurality of saw blades in accordance with this invention, as mounted in a triangular mounting frame which is driven back and forth in a rocking motion about a pivotal axis.
Figure 6:
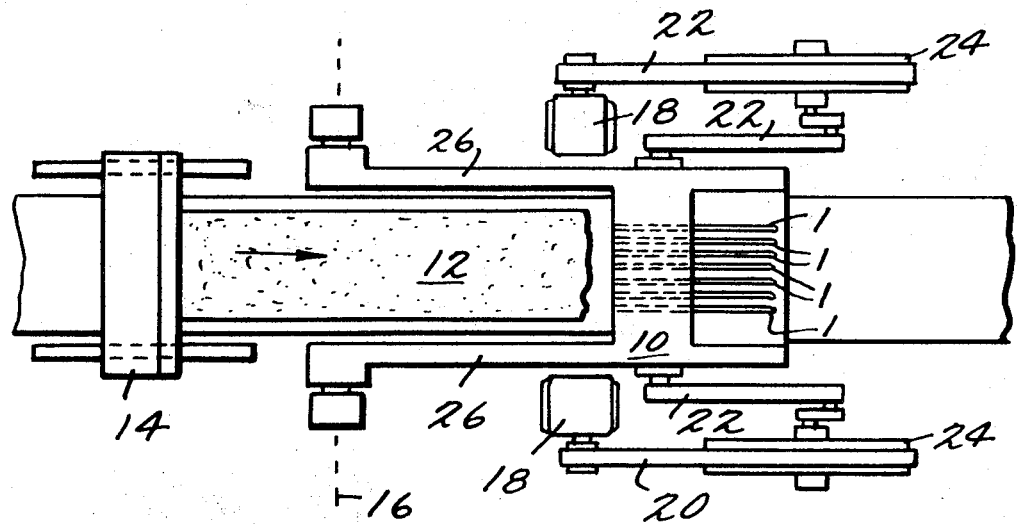
FIG. 6 is a top plan view of the installation shown in FIG. 5.

FIGS. 5 and 6 illustrate, somewhat schematically, a typical installation in which a plurality of blade means 1 are mounted in spaced parallel positions within a single triangular mounting frame 10 so that all cutting edges 3 of the plurality of blade means are aligned with each other and directed the same way for making simultaneous contact with a large block of granite 12, or other material, being advanced into a cutting zone. The material 12 may be advanced by any suitable conveying means 14 into a cutting zone determined by reciprocal rocking movement of the triangular mounting frame 10 about a pivotal axis 16. In the illustrated embodiment, the pivotal axis 16 also represents the center of a circular arc defined by the cutting edges 3 of the plurality of blade means 1 carried within the mounting frame 10. As will be explained in greater detail with reference to FIGS. 7 – 10, the individual blade means 1 are operatively secured in the mounting frame 10 so as to produce the tensile stresses 4 and 6 discussed with reference to FIGS. 1 – 4.

Any suitable means may be provided for rocking the triangular frame 10 about its pivotal axis 16. FIGS. 5 and 6 illustrate a driving means comprising motor means 18 (or power outputs from a motor source) which drive endless belt means 20 and crank assembly means 22 eccentrically secured between drive wheel means 24 and a portion of the triangular mounting frame 10. As is well known from the geometric principles involved, the mounting frame 10 is reciprocated back and forth about its pivotal axis 16 when the drive wheel means 24 are rotated in a single direction of rotation. The mounting frame 10 may be of any suitable shape and construction, the shape shown being one especially useful for suspending a plurality of blade means 1 under tension for making a plurality of cuts in a block of material 12 as it advances into the cutting zone. The mounting frame 10 is shaped to allow passage of the block of material 12 through the side of the mounting frame carrying the plurality of blade means 1, and the remainder of the frame may be bifurcated, as with framing elements 26 to straddle the block of material 12.

A similar type of mounting frame to that shown in FIGS. 5 and 6 may be used for suspending the type of blade means shown in FIGS. 2 and 4, with the exception that driving means would be provided for imparting straight-line reciprocations to the blade means (generally in directions along lines defined by their cutting edges 3).

Figure 7:
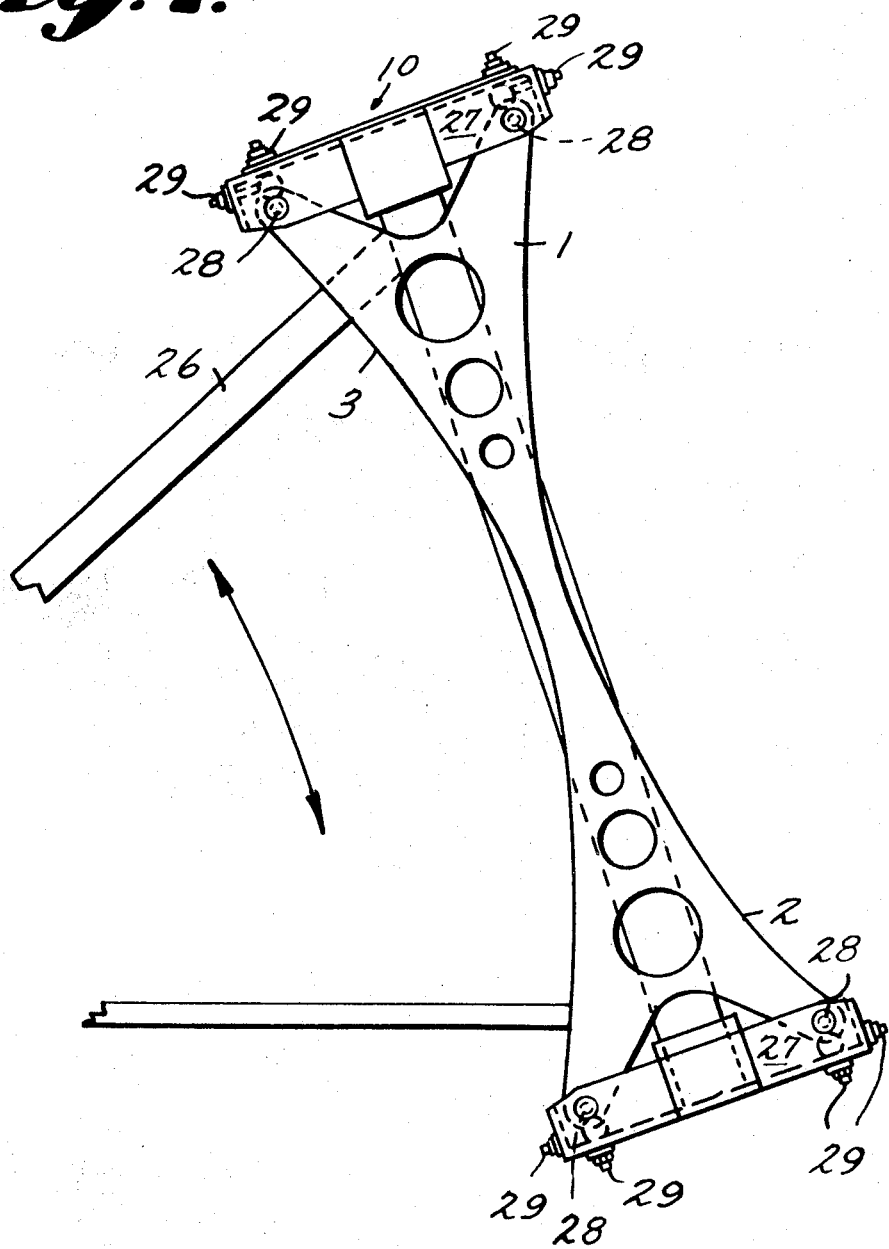
FIG. 7 is a more detailed view of a portion of the type of mounting arrangement shown in FIG. 5, with portions of the mounting frame omitted.

FIGS. 7 – 10 illustrate typical mounting arrangements for securing and stressing a single blade means 1 in a mounting frame having a triangular configuration as shown in FIGS. 5 and 6. As shown in FIG. 7, a blade means 1 is tensioned between mounting blocks 27 carried by the triangular frame 10. The mounting blocks 27 are carried at opposite ends of one rigid leg (offset from the position of the blade) of the frame means, and the two remaining legs of the triangular frame extend to the left in the FIG. 7 view to form an apex (not shown) and a pivotal axis, as described for the arrangement of FIGS. 5 and 6. The blade means is provided with a pair of securing means at each of its relatively broad end portions. In the illustrated arrangement, each securing means comprises an aperture formed through the blade means so that a tensioning device 28 can be received therethrough for mounting and tensioning the blade relative to the mounting frame. The tensioning devices 28 may comprise any known devices for attaching the ends of the blade means 1 to a mounting frame so as to produce the desired tensile stresses in the blade means 1. FIG. 7 illustrates an arrangement wherein each mounting block 27 includes a pair of screw means 29 for each of the tensioning devices 28, and the screw means 29 are mounted for adjustment on axes which are generally perpendicular to each other so as to provide for a full range of longitudinal and transverse (and resultant oblique) stressing of a blade means 1 secured to the mounting frame 10. A simple tensioning arrangement would include a bolt or other fastener passing through each aperture at the ends of the blade means 1, and the bolt would be carried by a yoke suspended within the mounting blocks 27 by two screw means 29 so that the yoke could be adjusted in longitudinal and transverse directions relative to the blade means 1.

Thus, the basic arrangement shown in FIG. 7 provides for a mounting of a blade means 1 within a frame so as to provide tensile stresses directed obliquely to an imaginary median line passing substantially centrally through the length of the blade means together with tensile stresses directed lengthways along the median line. This results in a tensile component perpendicular to the cutting edge 3, thereby preventing deflection of the blade during sawing operations. This type of tensioning is applied to a particular and preferred blade configuration of the type shown in FIG. 7 wherein the cutting edge 3 is defined as a segment of a circular arc having a center at the apex point (16 in FIGS. 5 and 6) about which a mounting frame for the blade means is rocked during a cutting operation. An example of a construction of a saw structure of this type provides a cutting edge 3 on a circular arc having a radius of 2,500mm and with the arcuate curvature of the back edge 2 of the blade being formed on the same length of radius. The blade was provided with diamond cutting elements spaced about 80mm apart along the curvature of the cutting edge 3, and this spacing corresponds to an angular displacement of about 1 degree 50 minutes about the center of the circular arc of the cutting edge 3.

Figure 8:
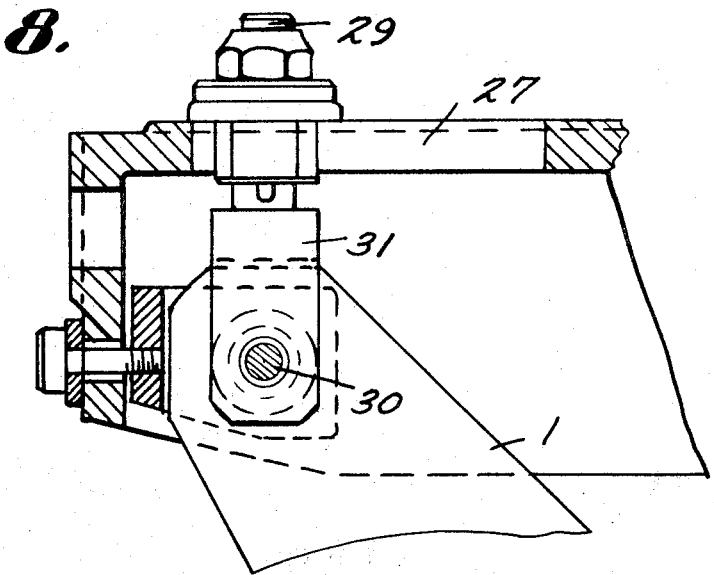
FIG. 8 is a detailed view, in enlarged scale, and partly in cross-section, of a typical tensioning device for securing one corner of an end of a blade means in a frame of the type shown in FIG. 7.
Figure 9:
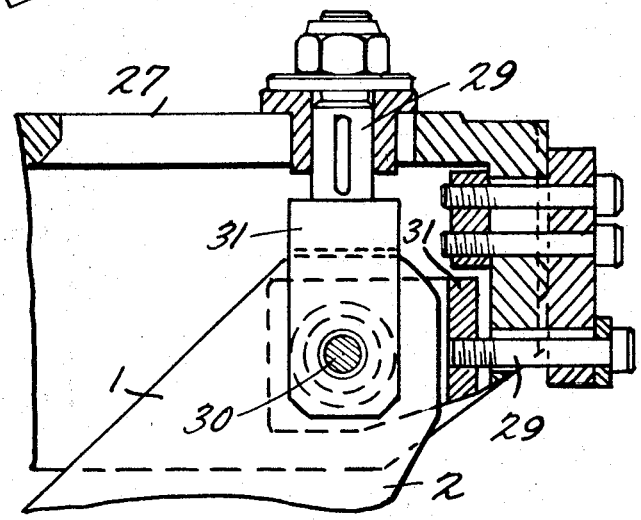
FIG. 9 is a detailed view, in enlarged scale, and partly in cross-section, of a typical tensioning device for mounting a second corner of the same end of the blade shown in FIG. 8.
Figure 10:
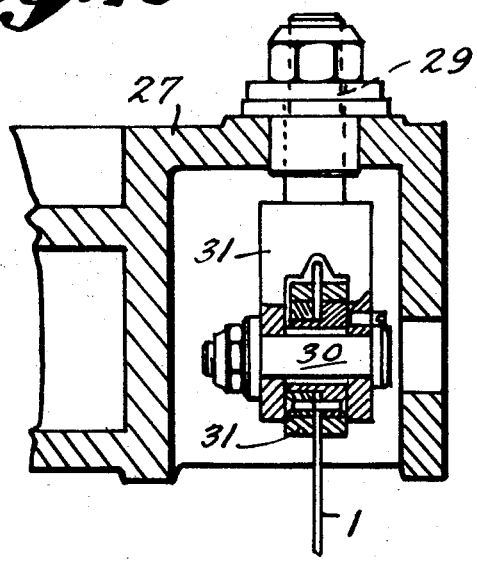
FIG. 10 is an enlarged view, partly in cross section, of details of the assembly viewed on line 10—10 of FIG. 8.

FIGS. 8 – 10 illustrate specific details of typical tensioning devices which may be used to secure a saw blade means 1 in the manner shown in FIG. 7. The specific tensioning device of FIGS. 8 – 10 are slightly different from those shown in FIG. 7, but the principles of adjustment and tensioning are the same. The details of FIG. 8 correspond to a typical securement of the upper left corner of a blade means mounted as shown in FIG. 7; FIG. 9 represents details of mounting for the upper right corner of the same blade means; FIG. 10 represents a view at right angles to that shown in FIG. 8.

In the arrangements of FIGS. 8 – 10, the blade means 1 is provided with two apertures at each of its ends for receiving fastening bolts 30 secured through yoke members 31 so as to retain an end portion of the blade within the yoke members associated with each tensioning device. The yoke members 31 are, in turn, suspended for adjustment by a pair of screw means 29 mounted on perpendicular axes relative to each other. The screw means 29 are mounted through a portion of a mounting block 27 so as to be rotatable relative to the mounting block 27. Threaded end portions of the screw means 29 engage portions of the yoke members 31 in a manner well known to this art, to effect adjustment of respective yoke members 31 along the central axes of the screw means 29 upon rotation thereof. Suitable locking nuts may be provided for fixing the position of the tensioning devices once a preferred stress has been imparted to the blade means 1, and slotted apertures are provided through the mounting block to permit a range of positions for the screw means.

The invention is not limited to the specific embodiments which have been described and illustrated above, and which are presented by way of example. Fully equivalent and obvious modifications of the invention will become apparent to those skilled in this art and are intended to be included within the scope of protection being sought herein.

What is claimed is:

1. An improved saw structure comprising: an elongate blade means having a relatively wide body portion defining first and second edges along the length of said blade means, said first edge being provided with cutting means and said second edge being arcuate in form, and said first and second edges being related to each other to provide said body portion with relatively wide end portions and a relatively narrow center portion;
   spaced securing means carried at the opposite end portions of the blade, said securing means being disposed at each of said end portions on opposite sides of an imaginary median line passing substantially centrally through the length of said blade means;
   a mounting frame means for suspending said blade means under tension; and
   tensioning devices carried by said frame means and attached to each of said securing means for suspending said blade means within said frame means under tension, said tensioning devices being positioned and arranged so that, when tightened, they will produce (a) tensile stresses in said blade means generally oblique to said median line so as to provide a component of said stresses generally perpendicular to said first edge, and (b) tensile stresses directed lengthwise along said median line, whereby deflection and warping of said blade means is inhibited during a sawing operation.

2. The improvement of claim 1 wherein said first edge of said blade means has the form of an incurved, subsantially circular arc that is related to the arcuate form of said second edge to produce a blade shape that is wider at its ends than at its center portion.

3. The improvement of claim 1 wherein said first edge of said blade means is curved slightly outwardly in its relaxed condition so that said first edge becomes a substantially straight line when the blade is placed under tension to produce said tensile stresses.

4. The improvement of claim 1 wherein said securing means comprise a pair of spaced apertures carried at each end of said blade means for receiving said tensioning devices carried by said mounting frame means.

5. The improvement of claim 1 wherein each tensioning device carried by said mounting frame means comprises a pair of screw means mounted for adjustment on axes which are generally perpendicular to each other.

6. The improvement of claim 5 wherein a pair of tensioning devices are carried at each end of said mounting frame for securement to opposite ends of said blade means mounted therein.

7. The improvement of claim 1 wherein a plurality of said blade means are mounted parallel to one another in a single mounting frame means.

8. The improvement of claim 7 wherein said single mounting frame means is mounted for being rocked about a pivot axis, and including driving means for rocking the mounting frame means.

9. The improvement of claim 8 wherein said pivot axis is located at the center of a circular arc defined by the curvature of said first edge.

* * * * *